(12) United States Patent
Katabi et al.

(10) Patent No.: US 10,756,831 B2
(45) Date of Patent: Aug. 25, 2020

(54) CHARACTERIZING TRANSMIT CHANNELS FROM AN ANTENNA ARRAY TO A TRANSCEIVER

(71) Applicant: Massachusetts Institute of Technology, Cambridge, MA (US)

(72) Inventors: Dina Katabi, Cambridge, MA (US); Deepak Vasisht, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/050,278

(22) Filed: Jul. 31, 2018

(65) Prior Publication Data

US 2019/0140753 A1     May 9, 2019

Related U.S. Application Data

(60) Provisional application No. 62/539,086, filed on Jul. 31, 2017.

(51) Int. Cl.

| | |
|---|---|
| H04W 4/00 | (2018.01) |
| H04B 17/309 | (2015.01) |
| H04B 17/15 | (2015.01) |
| H04B 17/391 | (2015.01) |
| H04L 25/02 | (2006.01) |
| H04B 17/19 | (2015.01) |
| H04B 17/29 | (2015.01) |
| H04B 7/0413 | (2017.01) |
| H04W 88/08 | (2009.01) |
| H04W 88/02 | (2009.01) |

(52) U.S. Cl.
CPC .......... *H04B 17/309* (2015.01); *H04B 17/15* (2015.01); *H04B 17/19* (2015.01); *H04B 17/29* (2015.01); *H04B 17/391* (2015.01); *H04L 25/0202* (2013.01); *H04B 7/0413* (2013.01); *H04L 25/0204* (2013.01); *H04L 25/0244* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 6,961,542 B2 | 11/2005 | Voyer | |
| 7,113,548 B2 * | 9/2006 | Tanaka | H04L 1/06 375/219 |
| 7,277,469 B2 * | 10/2007 | Brunel | H04B 7/086 375/147 |
| 7,359,733 B2 | 4/2008 | Liang et al. | |

(Continued)

OTHER PUBLICATIONS

B. Radunovic, A. Proutiere, D. Gunawardena, and P. Key. Dynamic channel, rate selection and scheduling for white spaces. In Proceedings of the Seventh Conference on emerging Networking Experiments and Technologies, p. 2. ACM, 2011.

(Continued)

*Primary Examiner* — Bob A Phunkulh
(74) *Attorney, Agent, or Firm* — Occhiuti & Rohlicek LLP

(57) ABSTRACT

Characteristics of channels from an antenna array to a transceiver are characterized based on reciprocity in an approach that eliminates a need for channel feedback from the transceiver. In some embodiments, these channel characteristics are used in MIMO communication to a plurality of transceivers from the antenna array.

14 Claims, 7 Drawing Sheets

(56) References Cited

U.S. PATENT DOCUMENTS

| | | | | |
|---|---|---|---|---|
| 7,398,056 | B1* | 7/2008 | Ebert | H04B 17/0085 |
| | | | | 455/42 |
| 8,134,503 | B2 | 3/2012 | Na et al. | |
| 2004/0184398 | A1* | 9/2004 | Walton | H04L 1/0003 |
| | | | | 370/203 |
| 2004/0213365 | A1* | 10/2004 | Murakami | H04B 7/0689 |
| | | | | 375/347 |
| 2004/0233838 | A1* | 11/2004 | Sudo | H04L 1/06 |
| | | | | 370/208 |
| 2004/0235472 | A1* | 11/2004 | Fujishima | H04B 7/0408 |
| | | | | 455/434 |
| 2008/0316105 | A1* | 12/2008 | Seong | G01S 5/12 |
| | | | | 342/442 |
| 2009/0196166 | A1* | 8/2009 | Hamaguchi | H04L 25/0232 |
| | | | | 370/210 |
| 2010/0159844 | A1* | 6/2010 | Yamazaki | H01Q 3/2605 |
| | | | | 455/69 |
| 2011/0013711 | A1* | 1/2011 | Wang | H04B 7/0439 |
| | | | | 375/267 |
| 2011/0159821 | A1* | 6/2011 | Park | H04B 7/0617 |
| | | | | 455/69 |
| 2011/0183690 | A1* | 7/2011 | Kobayakawa | G01S 5/0215 |
| | | | | 455/456.5 |
| 2012/0269301 | A1* | 10/2012 | Miyanaga | H04B 7/0439 |
| | | | | 375/340 |
| 2013/0201912 | A1 | 8/2013 | Sheng et al. | |
| 2014/0269389 | A1* | 9/2014 | Bukkfejes | H04W 24/08 |
| | | | | 370/252 |
| 2015/0099473 | A1* | 4/2015 | Szini | H04W 24/06 |
| | | | | 455/67.12 |
| 2015/0234033 | A1* | 8/2015 | Jamieson | G01S 5/04 |
| | | | | 455/456.1 |
| 2015/0289281 | A1* | 10/2015 | Kim | H04L 5/0023 |
| | | | | 375/267 |

OTHER PUBLICATIONS

Han, Yantao, Jiqing Ni, and Gaoke Du. "The potential approaches to achieve channel reciprocity in FDD system with frequency correction algorithms." In communications and Networking in China (CHINACOM), 2010 5th International ICST Conference on, pp. 1-5. IEEE, 2010.

K. Hugl, K. Kalliola, and J. Laurila. Spatial reciprocity of uplink and downlink radio channels in fdd systems. 2002.

L. Dong, G. Xu, and H. Ling. Prediction of fast fading mobile radio channels in wideband communication systems. In Global Telecommunications Conference, 2001. GLOBECOM'01. IEEE, vol. 6, pp. 3287-3291. IEEE, 2001.

L. Shi, P. Bahl, and D. Katabi. Beyond sensing: Multi-ghz realtime spectrum analytics. In 12th USENIX Symposium on Networked Systems Design and Implementation (NSDI 15), pp. 159-172, Oakland, CA, May 2015. USENIX Association.

Moradi, Saeed, Roya Doostnejad, and Glenn Gulak. "Downlink beamforming for FDD systems with precoding and beam steering." Global Telecommunications Conference (GLOBECOM 2011), 2011 IEEE. IEEE, 2011.

Qin, Weiwei, Zaichen Zhang, Liang Wu, Jian Dang, Yingying Yu, Yuxin Wei, and Chen Sun. "Downlink beamforming with estimated DOA from uplink transmission." In Ubiquitous and Future Networks (ICUFN), 2015 Seventh International Conference on, pp. 69-74. IEEE, 2015.

S. Sen, B. Radunovic, J. Lee, and K.-H. Kim. Cspy: Finding the best quality channel without probing. In Proceedings of the 19th annual international conference on Mobile computing & networking, pp. 267-278. ACM, 2013.

T. Shuang, T. Koivisto, H.-L. Maattanen, K. Pietikainen, T. Roman, and M. Enescu. Design and evaluation of lte-advanced double codebook. In Vehicular Technology Conference (VTC Spring), 2011.

W. Cao and W. Wang. A frequency-domain channel prediction algorithm in wideband wireless communication systems. In Personal, Indoor and Mobile Radio Communications, 2004. PIMRC 2004. 15th IEEE International Symposium on, vol. 4, pp. 2402-2405 vol. 4, Sep. 2004.

X. Rao and V. K. N. Lau. Distributed compressive CSIT estimation and feedback for FDD multi-user massive MIMO systems. CoRR, abs/1405.2786, 2014.

Y. Xu, G. Yue, and S. Mao. User grouping for massive mimo in fdd systems: New design methods and analysis. Access, IEEE, 2:947-959, 2014.

Palleit, Nico, and Tobias Weber. "Channel prediction in point-to-point mimo-systems." In Wireless Communication Systems (ISWCS), 2010 7th International Symposium on, pp. 91-95. IEEE, 2010.

Imtiaz, Sahar, Ghassan S. Dahman, Fredrik Rusek, and Fredrik Tufvesson. "On the directional reciprocity of uplink and downlink channels in frequency division duplex systems." In Personal, Indoor, and Mobile Radio Communication (PIMRC), 2014 IEEE 25th Annual International Symposium on, pp. 172-176. IEEE, 2014.

Gollakota, Shyamnath, Samuel David Perli, and Dina Katabi. "Interference alignment and cancellation." In ACM SIGCOMM Computer Communication Review, vol. 39, No. 4, pp. 159-170. ACM, 2009.

Lin, Kate Ching-Ju, Shyamnath Gollakota, and Dina Katabi. "Random access heterogeneous MIMO networks." In ACM SIGCOMM Computer Communication Review, vol. 41, No. 4, pp. 146-157. ACM, 2011.

Kaltenberger, Florian, Haiyong Jiang, Maxime Guillaud, and Raymond Knopp. "Relative channel reciprocity calibration in MIMO/TDD systems." In Future Network and Mobile Summit, 2010, pp. 1-10. IEEE, 2010.

Palleit, Nico, and Tobias Weber. "Obtaining transmitter side channel state information in MIMO FDD systems." In Personal, Indoor and Mobile Radio Communications, 2009 IEEE 20th International Symposium on, pp. 2439-2443. IEEE, 2009.

* cited by examiner

CHARACTERIZING TRANSMIT CHANNELS FROM AN ANTENNA ARRAY TO A TRANSCEIVER

CROSS-REFERENCE TO RELATED APPLICATIONS

This application claims the benefit of U.S. Provisional Application No. 62/539,086, titled "Characterizing Transmit Channels from an Antenna Array to a Transceiver," filed Jul. 31, 2017, which is incorporated herein by reference.

FEDERAL SPONSORSHIP

This invention was made with Government support under Contract No. FA8721-05-C-0002 awarded by the U.S. Air Force. The Government has certain rights in the invention.

PRIOR DISCLOSURES BY INVENTOR

Deepak Vasisht, Swarun Kumar, Hariharan Rahul, and Dina Katabi, "Eliminating channel feedback in next-generation cellular networks." In *Proceedings of the 2016 ACM SIGCOMM Conference*, pp. 398-411. Florianopolis, Brazil, August 2016.

BACKGROUND

This invention relates to characterizing transmit channels from an antenna array to a transceiver, and more particularly, to eliminating a need for channel feedback from the transceiver. In some embodiments, the characterized transmit channels are used for beamforming to a transceiver or in MIMO communication to a plurality of transceivers from the antenna array.

The high cost of cellular spectrum has motivated network providers to seek advanced MIMO techniques to improve spectral efficiency. Yet, only point-to-point MIMO multiplexing can be performed efficiently in current networks. More advanced MIMO solutions such as massive MIMO, coordinated multi-point, distributed MIMO, and multi-user MIMO, all require the base station to know the downlink channels prior to transmission. In the absence of this information, the base station cannot effectively beamform its signal to its users. A prior way to learn the downlink channels is to have the remote device (e.g., a user's cellphone, or other "user equipment") perform the measurements and send the channels back to the base station. Measuring the channels on the one thousand LTE subcarriers for every antenna on the base station, and feeding those measurements back to the base station would generate much overhead. This feedback overhead is excessive even in today's networks which have a limited number of antennas on the base station—about 4.6 Mb/s of signaling per user in a 20 MHz 4×2 network. The problem escalates in future 5G networks which rely on large MIMO systems with many antennas (massive MIMO, CoMP, etc.). In fact, the LTE standardization body that is investigating high-order MIMO systems with up to 64 antennas (Release 13), has declared this problem as a major challenge for future LTE networks.

SUMMARY

There is a need to estimate downlink channels without requiring channel-information feedback from remote devices. One approach that can help achieve this goal is based on channel reciprocity. Reciprocity implies that uplink and downlink channels are the same, so long as both the base station and the clients transmit on the same frequency band. Indeed, reciprocity has been proposed to minimize channel feedback in WiFi networks, where both the access point and its clients transmit on the same frequencies. Unfortunately, the vast majority of today's cellular connections (including every LTE network in the U.S.) employ Frequency Division Duplexing (FDD), whereby they transmit data from the remote device and from the base station at different dedicated frequency bands. There is therefore a need to estimate downlink channels based on received uplink transmissions in different frequency bands from the remote devices.

In one aspect, in general, a method for characterizing transmit channels from an antenna array to a transceiver makes use of a first transmission received from the transceiver at a plurality of (K) antennas of the antenna array. The first transmission includes components at a first plurality of frequencies. For example, the first transmission is an OFDM encoded transmission, and the first plurality of frequencies comprise the frequencies of the components of the OFDM signal. Receive characteristic data is computed from the received first transmission. The receive characteristic data includes, for each frequency (f) of the first plurality of frequencies, and for each antenna (k) of the plurality of antenna, a receive channel characteristic ($h_{k,f}$) representing at least a phase of a channel, and optionally a gain of the channel. Propagation data characterizing a plurality of propagation paths from the transceiver to the antenna array is then computed. The propagation data includes for each antenna (k) of the antenna array and each path (n) data characterizing a propagation path length of a transmission path ($d_n$) between the transceiver and the antenna. For example, the propagation path length may be expressed in units of distance, or equivalently, in units of wavelengths at a particular frequency, such as at a frequency of the received first transmission. Transmit characteristic data is then computed from the propagation data. The transmit data includes, for each frequency (f') of a second plurality of frequencies different than the first plurality of frequencies a transmit channel characteristic ($h_{f',k}$) representing at least a phase of a channel. For example, the second plurality of frequencies comprise OFDM frequencies for transmission from the antenna array to the transceiver in a frequency division duplex configuration in which transmissions to the transceiver are sent in a different frequency range than a range of frequencies used for transmissions from the transceiver. A second transmission is then transmitted from the antennas of the antenna array directed to the transceiver. The second transmission includes components at the second plurality of frequencies. Transmitting the second transmission includes transmitting a plurality of antenna signals from corresponding antennas of the antenna array, each antenna signal being formed according to a transmit data characteristic ($h_{f',k}$) for said antenna. Optionally, the propagation data further includes for each antenna (k) of the antenna array and each path (n) data characterizing a frequency independent phase ($\phi_n$) associated with the path. For example, such a frequency-independent phase is associated with a reflection effect on the path, which may introduce a fixed phase increment (e.g., 180° on the path).

In some embodiments, the method is implemented in a system (e.g., a based station) associated with the antenna array. The approach is applicable to cellular telephone networks, but it should be recognized that the approach is applicable to a wide range of radio systems, or other propagated wave communication systems, including audio and optical wave systems. In some implementations, the approach summarized above is implemented in the OFDM physical layer.

The method solves a technical problem of determining a transmission channel without either (a) using the same frequencies for transmitting and receiving (in which case the transmit and receive channels may be assumed to be the same), or (b) receiving feedback from the receiver providing information that the transmitter can use to determine the transmit channel. Avoiding the need for channel feedback provides technical improvements including reducing the processing required by the receiver because the receiver does not have to compute the channels on the received path(s), and reducing the time delay that results from having to wait for the receiver to provide the channel feedback. These improvements are particularly important in large scale Multi-Input-Multi-Output (MIMO) systems in which knowledge of the transmissions channels is critical for maintaining high data rates.

DETAILED DESCRIPTION

Preliminaries

A wireless channel can be represented as a complex quantity (i.e., with a real and an imaginary part) that describes how a radio signal changes (e.g., in magnitude and phase at different frequencies) as it propagates from transmitter to receiver over the channel. Such a complex-valued wireless channel characterization (referred to simply as the "wireless channel") is a direct function of the paths along which the signal propagates as well as the transmission frequency. In particular, the channel of a narrowband signal (considered here to have only a single frequency) traversing a single path is given by $$h = a\exp\left(-j2\pi\frac{d}{\lambda} + j\phi\right), \quad (1)$$

where $\lambda$ is the wavelength, a is the complex path attenuation, d is the distance the path traverses, and $\phi$ is a frequency-independent phase that captures whether the path is direct or reflected. Since the signal travels along multiple paths, say N paths, the channel at a receiver antenna can be written as $$h = \sum_{n=1}^{N} a_n\exp\left(-j2\pi\frac{d_n}{\lambda} + j\phi_n\right), \quad (2)$$

which is the sum of the channel components over all paths that the signal takes between transmitter and receiver.

Finally, we note that a base-station may have multiple antennas, so there is one channel per antenna. For a K-antenna linear-array base station with antenna spacing l, the set of channels, $h_i$ on antenna i (for $0 \le i < K$) is $$h_i = \sum_{n=1}^{N} a_n\exp\left(-j2\pi\frac{d_n}{\lambda} + j\phi_n\right)\exp\left(-j2\pi\frac{il\cos\theta_n}{\lambda}\right), \quad (3)$$

where $\theta_n$ is the angle-of-arrival of the signal along path n, $d_n$ is the distance travelled by the signal along path n to the first antenna and l is the pairwise separation between antennas on the base station. More generally, the remote device may also have multiple antennas (with distinct channels to each of the antennas) however of the sake of exposition, the remote device is treated as having a single antenna or at least emitting signals from multiple antennas at fixed relative phase.

Note that in general, the term "wireless channel" may be used to refer to the characteristics at a particular frequency, or at a particular frequency for propagation from a particular direction or over a particular path, in which case it may be represented by a scalar complex quantity (or equivalently by a pair of real quantities). The term may also be used to refer to a collection of quantities associated with different frequencies and/or different paths or directions, in which case it may be represented by a complex vector. However, the usage should be evident from the context and mathematical notation used below.

System Overview

Figure 1:
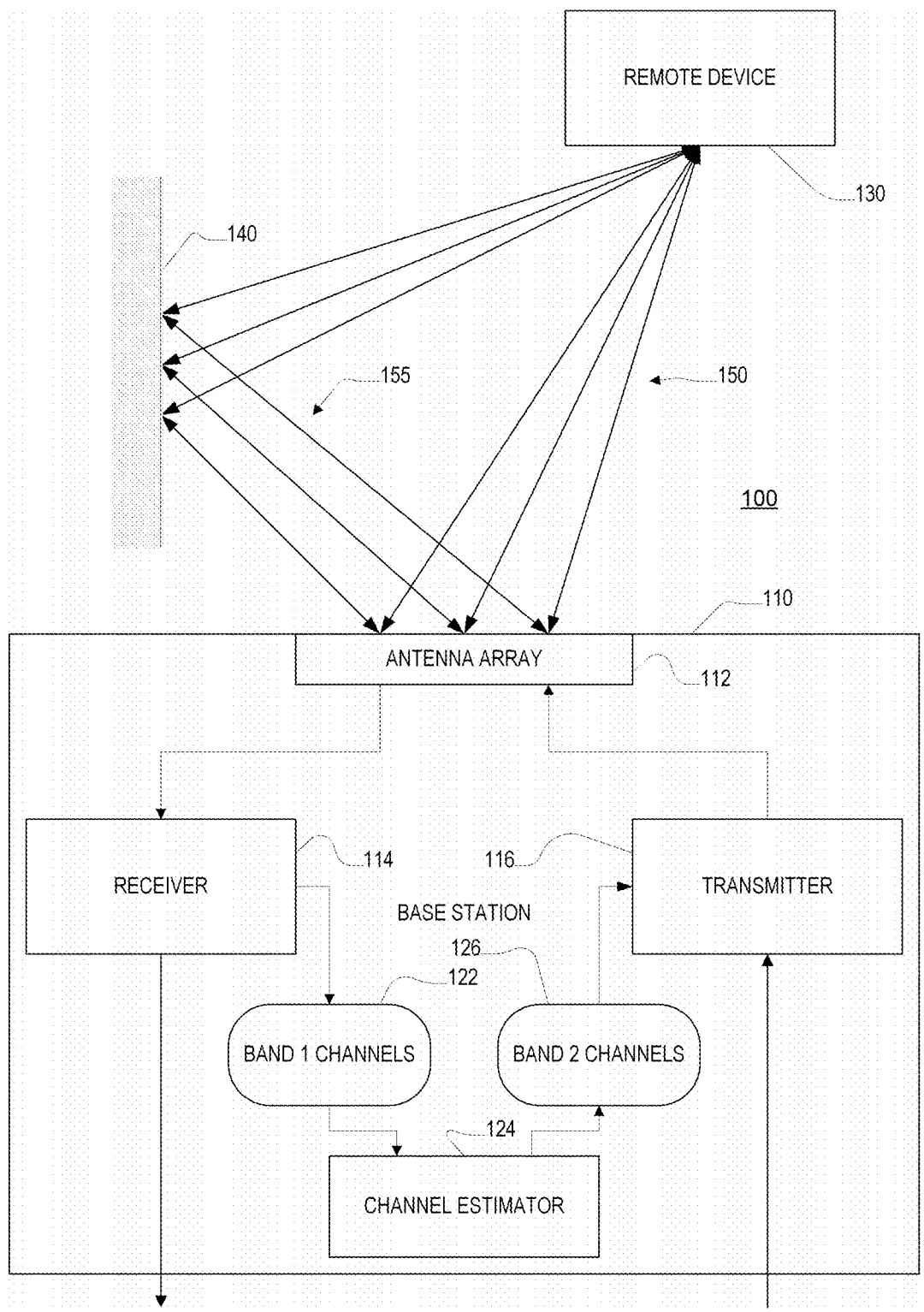
FIG. 1 is a communication system including a base station and a representative remote device.

Referring to FIG. 1 a primary objective of a wireless communication system 100 is to infer wireless channels at corresponding frequencies in a target (downlink) frequency band, given the wireless channels other corresponding frequencies in a different (uplink) frequency band. In order to achieve this objective, the system relies on the observation that the channels are a direct result of the signal paths from the transmitter of the remote device to the receiver of the base station. While the channels change across frequencies, the underlying paths stay the same. Therefore, a frequency-invariant representation of signal paths from wireless channels on any given frequency is used such that one can recreate an estimate of the channels at any other frequency of interest.

Continuing to refer to FIG. 1, a base station 110 has an antenna array 112 (e.g., with K antennas in a linear or other geometric arrangement) which is used both for transmitting and receiving by the base station. The base station serves many remote devices 130 (e.g., user devices including mobile phones), a single represented one of which is illustrated in the figure. In this illustration, two radio propagation paths are shown: a first direct path 150 between the remote device 130 and the base station 110; and a second reflected path 155 between the remote device and the bases station reflecting off an object 140. Of course in practice there may be many more paths, for example, reflecting from multiple objects, and there is not necessarily a direct unobstructed path. In the illustration, separate paths are shown to different antennas of the antenna array 112. In practice the remote devices are sufficiently far from the base station that the paths are essentially parallel.

Note that although the description of this example is in the context of a base station using uplink channels to estimate downlink channels, the approach may be equally applied to a remote device that has an antenna array to estimate uplink channels from the remote estimate of downlink channels. Indeed, two devices in MIMO communication may each use the approach described herein concurrently for communication between those devices.

The base station 110 has a receiver 114 that processes signals acquired via the antennas of the antenna array 112, and a transmitter 116 that provides signals for transmission via the same antennas. In this illustration, the receiver processes signals at frequencies in a first frequency band (uplink "band 1") and the transmitter provides signals at frequencies in a second, generally disjoint, frequency band (downlink "band 2"). As part of the receiving process, the receiver 114 determines channels 122 (i.e., complex values representations) of the channels from the remote device 130 to each of the antennas of the antenna array 112 for a set of frequencies of band 1. A channel estimator 124 processes those channels and determines the channels 126 for a set of frequencies of the second band. The transmitter 116 then uses these channels in transmission to the remote device 130. For example, knowledge of the band 2 channels 126, as well as the channels for transmission to other remote devices (not shown) permits the transmitter to determine the signals to transmit via the antenna array 112 to best transmit information to each of the remote devices with minimal interference, for example, maximizing the communication capacity within the limits (e.g., power limits) on the base station. For example, in a beamforming application, a transmit signal x(t) may be multiplied by the complex conjugate of the downlink channel $h^*_i$ from each antenna i to achieve constructive combination of the signals emitted from the antennas. In other examples, the estimated downlink channels to multiple remote transceivers are combined to precode multiple transmit signals for transmission to multiple transcievers using MIMO techniques. Similarly, for a remote device having multiple antennas, such MIMO techniques may be used to precode multiple signal streams for transmission to the remote device.

The frequency-independent representation of signal paths that is used in one or more embodiments described below makes use of Eqn. 3 presented above, which defines wireless channels based on underlying propagation paths. Specifically, wireless channels $h_i$ for respective antennas (i) depend on four distinct attributes of signal paths: (1) their attenuation $a_n$; (2) their frequency-independent phase $\phi_n$, that distinguishes the direct path from reflected paths n; (3) their angle of arrival $\theta_n$; and (4) the distance they traverse $d_n$. These four quantities, when listed for each path, fully define the wireless channels on any given frequency f (i.e., at a particular wavelength $\lambda=c/f$ where c is the propagation speed). More importantly, none of these parameters depend on the frequency at which the channel is obtained. In other words a set of four-tuples of the form ($a_n$, $\phi_n$, $\theta_n$, $d_n$) is a natural representation of a set of signal paths that is frequency-invariant. (Note that although the description below refers to a single angle of arrival, the approach is equally applicable with straightforward modification to three-dimensional propagation in which the direction of arrival is characterized by two angles, one in a horizontal plane and one in a vertical plane.)

Figure 2:
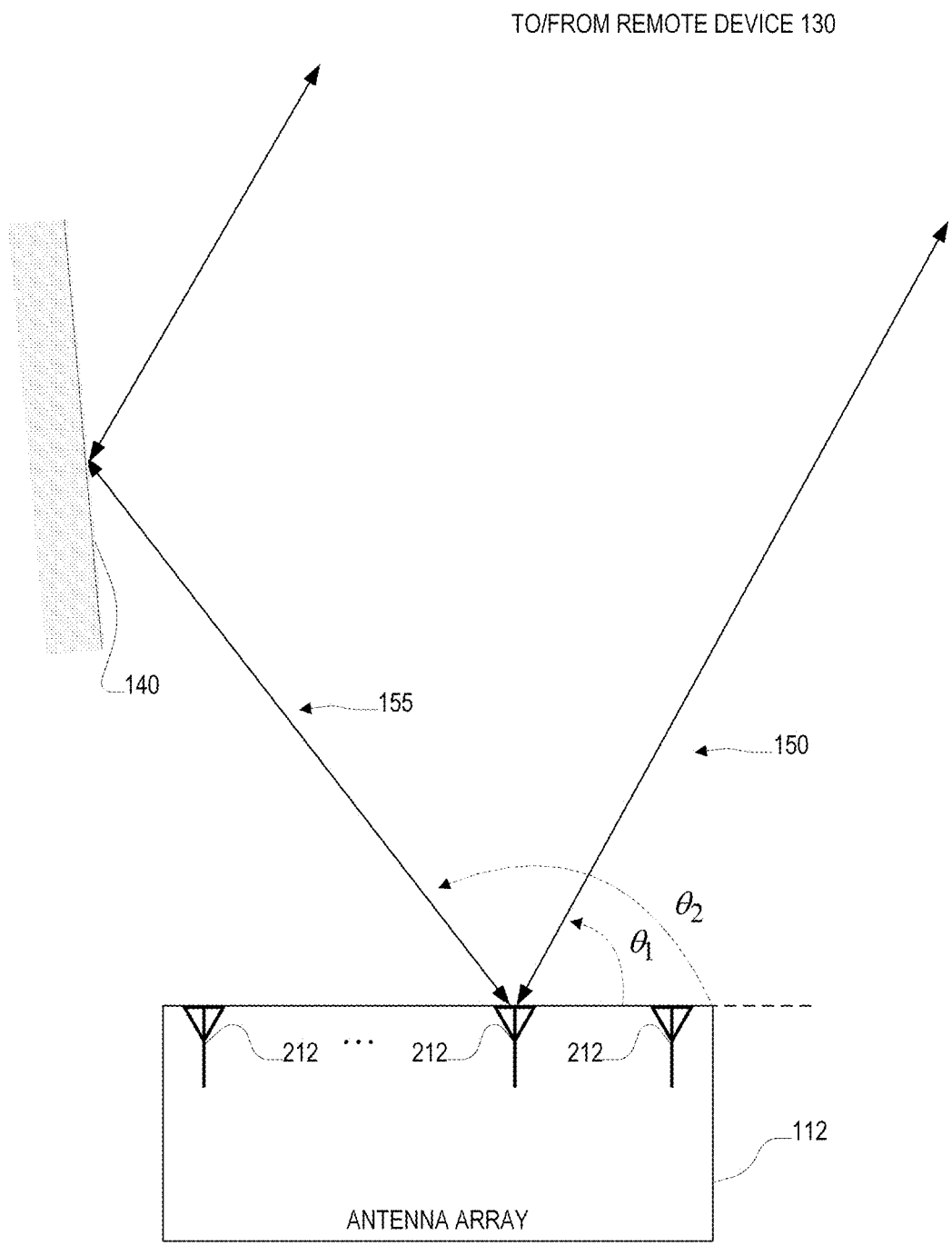
FIG. 2 is an example with two signal paths.

Given this representation of signal paths, an approach to extract it given wireless channels on any frequency is described below. Note that wireless channels in Eqn. 3 take the form of the familiar discrete Fourier transform (parameterized by spatial angle-of-arrival $\psi=\cos\theta$). In particular, this Fourier transform takes as input quantities that depend directly on the signal path four-tuples. However, there is also a dependence on frequency. It is instructive to study how the same signal 4-tuples manifest as different wireless channels on two different frequencies, say 600 MHz and 650 MHz. Consider FIG. 2 which depicts signals from the phone to the base station traversing two paths. Let the corresponding signal path 4-tuples be: ($a_1$, $\phi_1$, $\theta_1=80°$, $d_1=19.5$ m); and ($a_2$, $\phi_2$, $\theta_2=105°$, $d_2=23$ m). These undergo four distinct transformations, inclusive of the Fourier transform, before they become the overall wireless channels on the two frequencies (from FIGS. 2 to 5 as described below.

Figure 3:
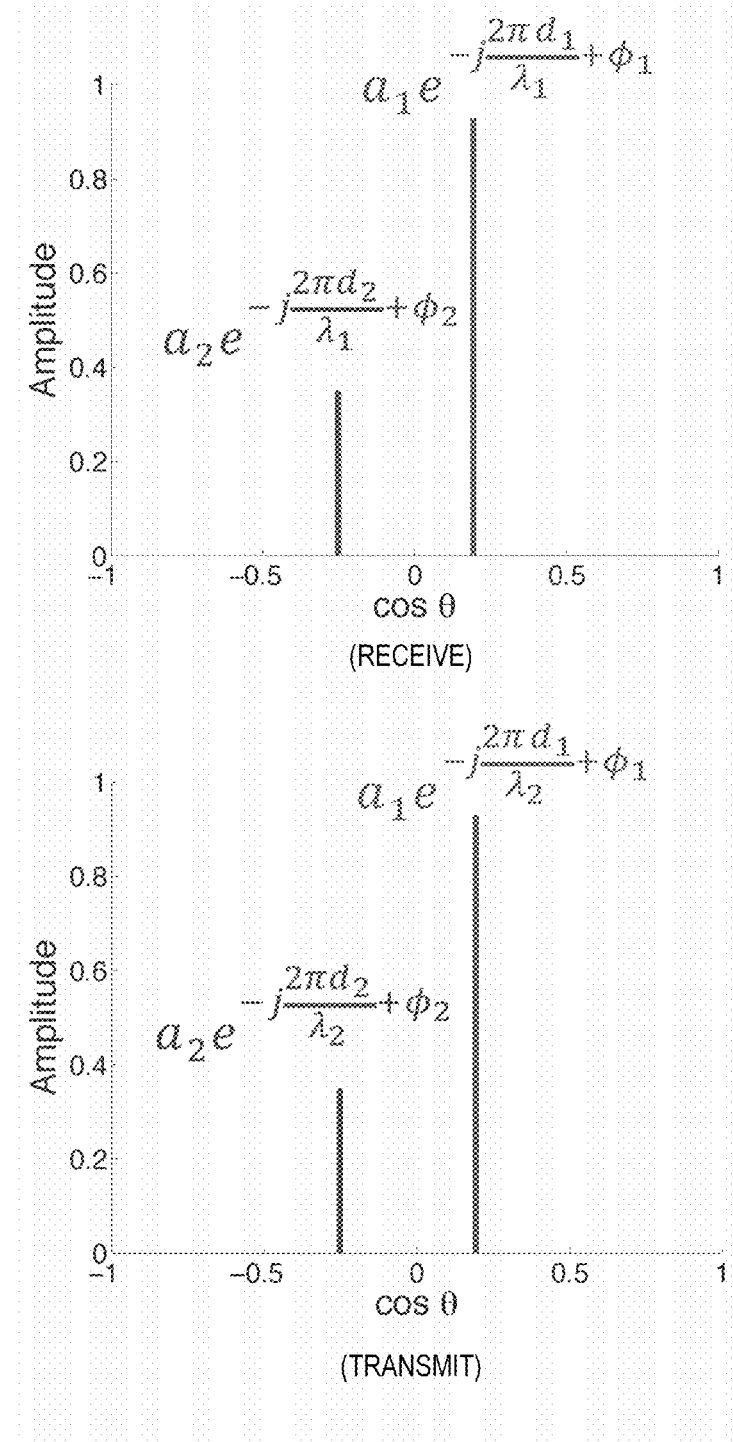
FIG. 3 is a pair of plots of pathlengths for the example of FIG. 2.
Figure 4:
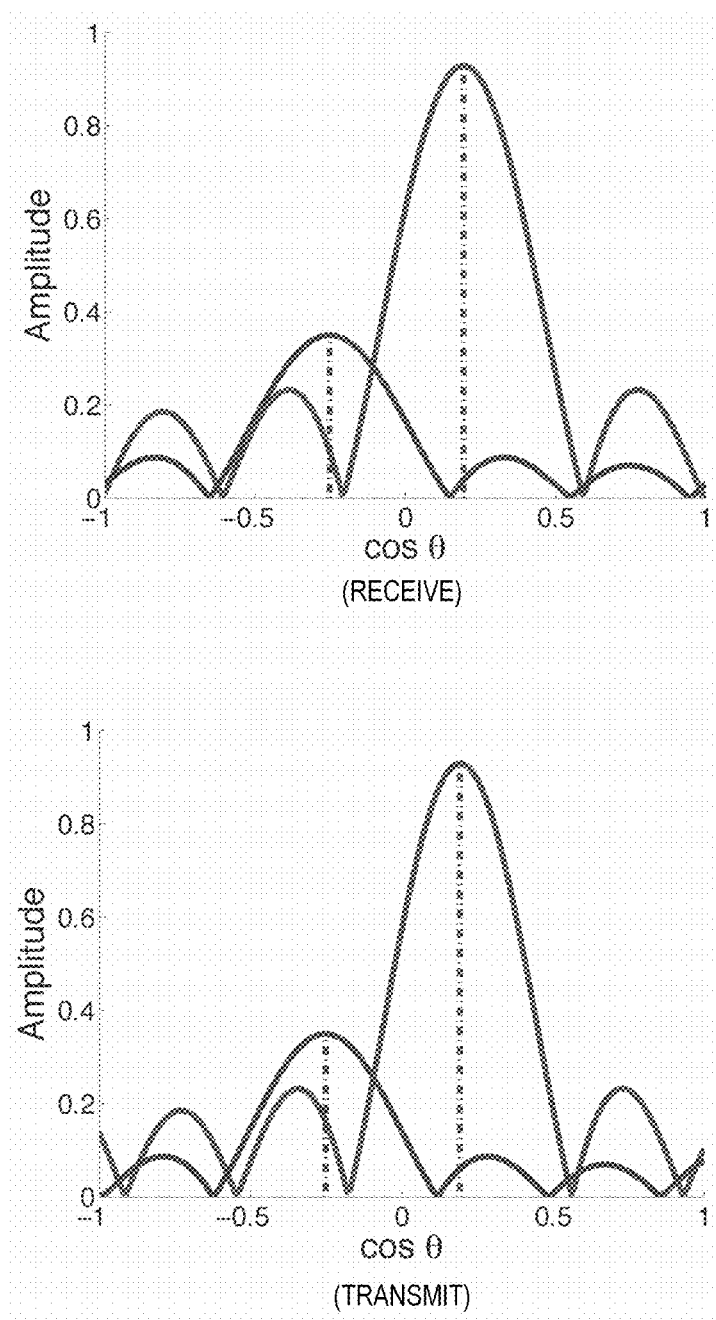
FIG. 4 is a pair of plots of channel amplitude for the paths of example of FIG. 2.

The signal path 4-tuples are first mapped to inputs of the Fourier transform. Recall from Eqn. 3 that these inputs are simply the wireless channel components along individual paths at the two frequencies. FIG. 3 plots the amplitude and notes the phase of the signal components from the two paths across angle-of-arrival for the receive (uplink) and transmit (downlink) frequencies. Both these plots have two spikes that correspond to the two paths, scaled by their respective attenuations. The two plots differ only in the phase of the spikes, which scales inversely with the wavelength of the two bands.

Before application of the Fourier transform, an effect that occurs because the cellular base station has a limited number of antennas (K=5 in this example) is taken into account. Specifically, the base station samples the signal from the two paths within a window of space (the space between the first and last antenna). Since the channels are observed only within a window of space, the signal's angles of arrival are convolved with a sinc function. This is a standard property of the Fourier transform: multiplying by a window in one domain translates into a convolution with a sinc in the other domain. Thus each impulse from the corresponding angle as in FIG. 3 is transformed as a sinc function as shown in amplitude plots of FIG. 4. The convolution with a sinc makes the signal look different across frequencies. Specifically, the precise shape of the sinc changes with the transmission frequency. This is because the distances between antennas are measured relevant to the wavelength of the transmission signal. Hence, at higher frequency the distance between antennas seem larger and the sinc narrower.

The signals components from different paths super-impose at the receiver (i.e., at the base station for an uplink signal). Thus, the base station gets a super-position of the two sincs in FIG. 3, scaled by their respective phases that (as described earlier) are different. This results in FIG. 5 that now look significantly different due to phase differences of the components.

Figure 5:
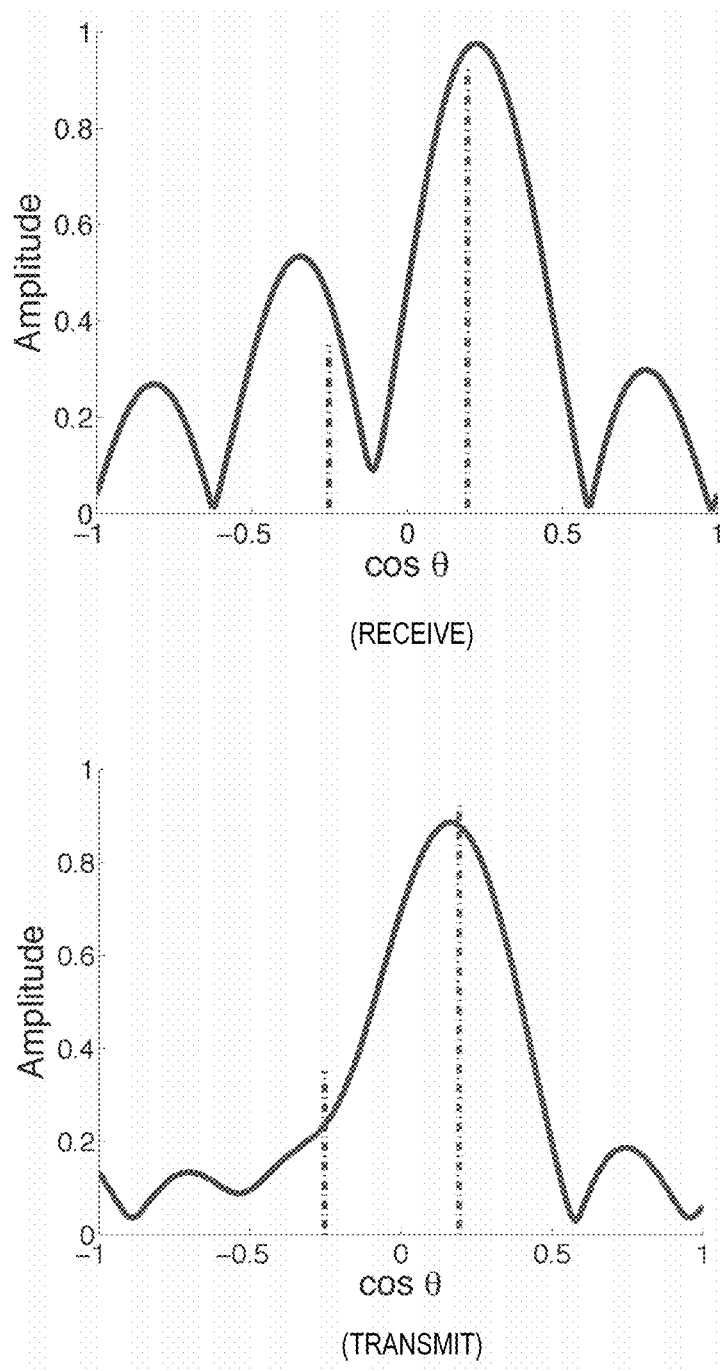
FIG. 5 is a pair of plots combined channel amplitude for the example of FIG. 2.

Finally, the Fourier transform is applied to take the super-imposed sincs in FIG. 5 to the wireless channels sampled at the five antenna locations.

Thus, to move from wireless channels to their underlying signal paths, this process is inverted by: (1) Inverting the Fourier transform; (2) Separating the super-imposed sincs; (3) Undoing the windowing effect; and (4) Correcting for the difference in phase between the two frequencies. This procedure is described mathematically below and formulated as an L−2 minimization process.

The mathematical description of the procedure therefore specifies a software implementation with processor instructions implementing the mathematically-specified data transformations of digitally represented quantities and/or a hardward implementation with dedicated (e.g., an ASIC) or configurable circuitry (e.g., an FPGA) in which circuit components (e.g., multipliers, adders, etc.) implement the transformations of such digitally-represented quantities.

Procedure

In this section, the approach introduced above is formalized by specifying the transform between wireless channels and signal paths. The procedure for essentially inverting this transform is then specified as L-2 optimization procedure whose solution results in the frequency-invariant signal path characteristics. These paths are then used to infer the channels on a desired band.

Figure 6:
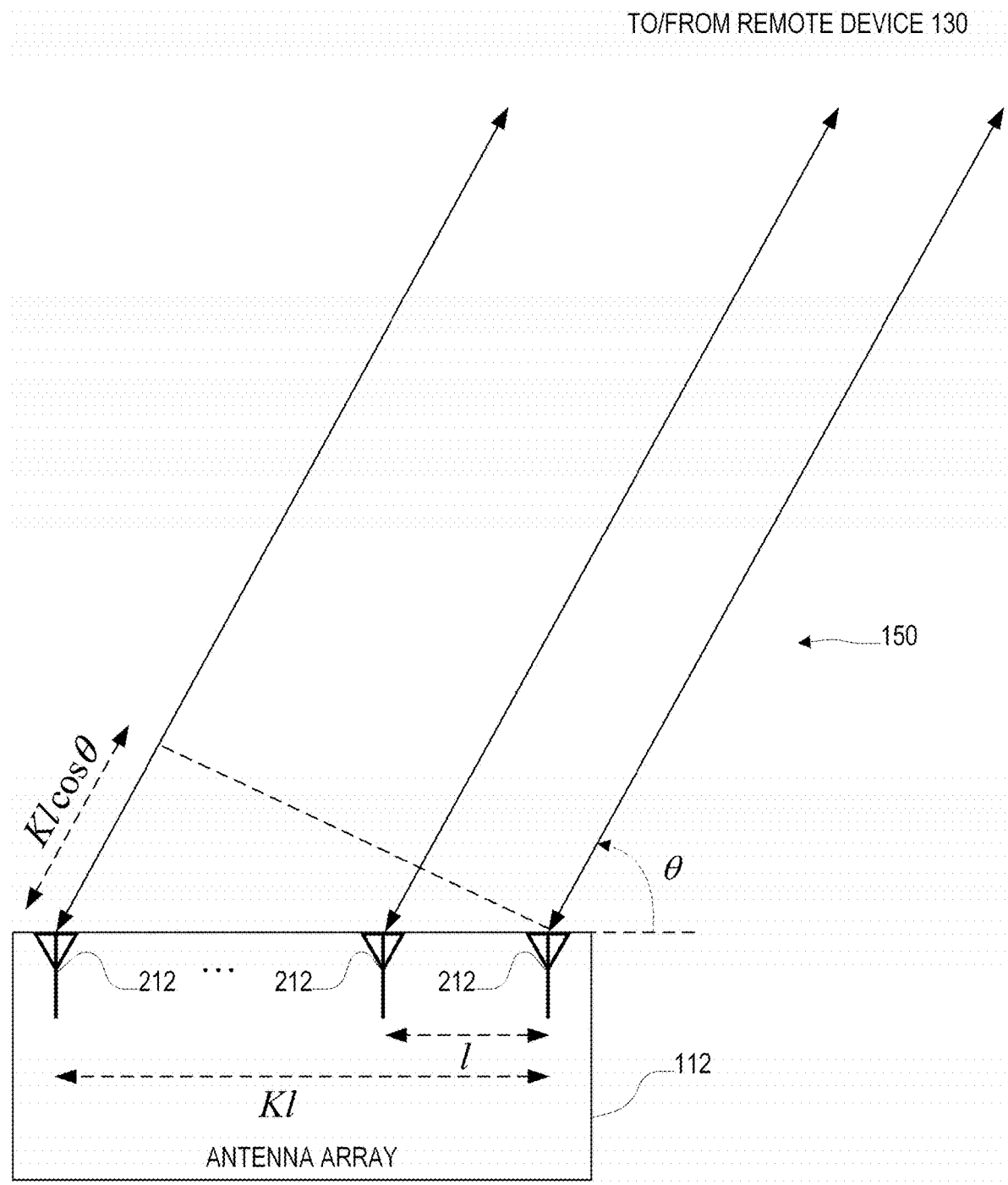
FIG. 6 is an illustration of a single path to an antenna array.

Referring to FIG. 6, assume that the signal from the remote device to an antenna array 112, which has K antennas 212, arrives along N distinct paths. The antennas are indexed by 0, 1, ..., K-1 and l is the inter-antenna separation. Note that in typical antenna arrays, and in the present example, the inter-antenna spacing is set to $\lambda/2$, where $\lambda$ is the signal wavelength. Further, denote the signal path 4-tuple of the $n^{th}$ path to be $(a_n, \phi_n, \theta_n, d_n)$.

Since the Fourier transform described in equation 3 operates on the cos $\theta$ domain, the procedure is described in terms of cos $\theta$, which is denoted $\psi = \cos \theta$. Then, the contribution of the $n^{th}$ path to the directional representation of the signal at wavelength, $\lambda_1$ can be given by:

$$P_1^n(\psi) = a_n \exp\left(-j\frac{2\pi d_n}{\lambda_1} + j\phi_n\right)\delta(\psi - \psi_n), \quad (4)$$

where $P_1^n(\psi)$ represents the signal component along direction $\psi$ and $\delta(\cdot)$ is the impulse function. $\phi_n$ denotes the phase accumulated by the $n^{th}$ path by virtue of undergoing reflections, $a_n$ is the amplitude of the path as received on antenna 0 and $\psi_n = \cos \theta_n$. This representation corresponds to the representation in FIG. 3.

As described before, the signal sensed by the antenna array along different spatial directions is the inverse Fourier transform of the channel measurements on the different antennas of the antenna array. Since the antennas on the base station sample a finite space, it is equivalent to applying a window on the antenna domain of width $L/\lambda_1$, where $L (=Kl)$ is the width of the antenna array. This creates a sinc in the spatial direction domain, i.e. the path directions get convolved with $(L/\lambda_1)$ sinc $(L\psi/\lambda_1)$. Thus, if we represent the spatial profile after convolution of the sincs with $P_1^n$ as $P_2^n$, then $P_2^n$ is given by $$P_2^n(\psi) = \left\{a_n \exp\left(-j\frac{2\pi d_n}{\lambda_1} + j\phi_n\right)\delta(\psi - \psi_n)\right\} * \frac{L}{\lambda_1}\text{sinc}\left(\frac{L\psi}{\lambda_1}\right) \quad (5)$$

where * denotes convolution operation. Thus, $P_2^n(\psi)$ refers to the graphs in FIG. 4.

In case of multiple paths, the perceived path profile is simply the complex sum of individual path profiles. Thus, the overall profile $P_3(\psi)$, can be computed as:

$$P_3(\psi) = \sum_{n=0}^{N-1} P_2^n(\psi). \quad (6)$$

This equation mathematically represents FIG. 5.

Finally, the channel measurements at the antennas are just the Fourier transform of the signal arriving along spatial directions. In order to represent this mathematically, observe that equation 6 can be simplified as follows:

$$P_3(\psi) = \sum_{n=0}^{N-1} \left\{a_n \exp\left(-j\frac{2\pi d_n}{\lambda_1} + j\phi_n\right)\delta(\psi - \psi_n)\right\} * \frac{L}{\lambda_1}\text{sinc}\left(\frac{L\psi}{\lambda_1}\right) \quad (7)$$

$$= \sum_{n=0}^{N-1} a_n \exp\left(-j\frac{2\pi d_n}{\lambda_1} + j\phi_n\right) \times \frac{L}{\lambda_1}\text{sinc}\left(\frac{L(\psi - \psi_n)}{\lambda_1}\right) \quad (8)$$

Equation 8 follows from equation 7 by using the convolution property of the delta function.

The above four transformations can be summarized succinctly as a sequence of matrix operations. Specifically, given that the antennas are positioned at K discrete locations in space, we can now represent the Fourier transform by a matrix multiplication. Let us define F to be the K×K Fourier matrix, such that $$F_{ij'} = \exp\left(-j\frac{2\pi i l j' \psi'}{\lambda_1}\right),$$

where $\psi'$ defines the discretization on the variable $\psi$ (where $\psi' = 2/K$). Note that when the antenna separation, l, is not equal to $\lambda_1/2$, the Fourier matrix is replaced by the non-uniform Fourier matrix and $\psi' = \lambda/L$, where $L = Kl$ is the total antenna array aperture. Further, define S to be the K×N matrix where $S_{ij}$ denote the value of the sinc function corresponding to the $j^{th}$ path at $\psi = i\psi'$. Specifically, $$S_{ij} = \frac{L}{\lambda_1}\text{sinc}\left(\frac{L(i\psi' - \psi_j)}{\lambda_1}\right).$$

Finally, define $\vec{a}'_1$ to be the N dimensional vector such that the $i^{th}$ component is $$a_i \exp\left(-j\frac{2\pi d_i}{\lambda_1} + j\phi_i\right).$$

Then, the channel measurements at the antennas, represented by $\vec{h}_1$ can be given by:

$$\vec{h}_1 = FS\vec{a}'_1 \quad (9)$$

Note that, $\vec{h}_1$ is the K dimensional vector such that the $k^{th}$ element represents the channel measurement at antenna k. Observe that, in the vector notation, the $i^{th}$ component of $S\vec{a}'_1$ is nothing but $P_3(i\psi')$. In summary, we now have a transform that maps signal paths to channels.

Having described how channels are derived from the underlying physical paths, the next goal is to invert this mechanism. In other words, given channel measurements, $\vec{h}_1$ on wavelength $\lambda_1$, we need to identify the underlying physical paths. We do so by inverting the individual components of the transform—the Fourier Transform, windowing and super-position and phase variations.

The first step is to invert the effect of the Fourier transform, which is simply the inverse Fourier transform on the channel measurements, $\vec{h}_1$. This can be achieved by multiplying $\vec{h}_1$ by $F^{-1}$.

Next, we need to invert the superposition effect, stated in equation 6 and the windowing effect from equation 5. These two effects are jointly represented by the matrix multiplication, $S\vec{a}'_1$ in equation 9. The goal is to infer S and $\vec{a}'_1$, given the perceived signal paths, $F^{-1}\vec{h}_1$. Observe that, S depends solely on the directions of the underlying paths ($\psi_n$). Thus, in order to compute S, we need to find $\{\psi_n\}_{n=0}^{N-1}$ for each of the N sinc functions that sum up to yield this profile. We pose this problem as an L–2 norm minimization problem. We optimize for $\{a'_{1,n}\}_{n=0}^{N-1}$ and $\{\psi_n\}_{n=0}^{N-1}$ such that $\|F^{-1}\vec{h}_1 - S\vec{a}'_1\|^2$ is minimized. This objective function can be written as:

$$O(\{a'_{1,n},\psi_n\}_{n=0}^{N-1}) = \|F^{-1}\vec{h}_1 - S\vec{a}'_1\|^2 \quad (10)$$

where $a'_{1,n}$ denotes the $n^{th}$ element of $\vec{a}'_1$

In order to simplify the problem, observe that, if we know S, the optimization problem becomes a linear optimization problem and can be solved for $\vec{a}'_1$ in the closed form. In particular, the minimum value can be attained by setting $\vec{a}'_1 = S^\dagger F^{-1}\vec{h}_1$, where $S^\dagger$ denotes the pseudo-inverse of S.

Thus, the objective function in equation 10 can be re-framed as:

$$O(\{\psi_n\}_{n=0}^{N-1}) = \|F^{-1}\vec{h}_1 - SS^\dagger F^{-1}\vec{h}_1\|^2 \quad (11)$$

We have, now, reduced the problem to identifying the directions of the signal paths that contribute to the directional signal profile. This objective function, however, is non-linear and non-convex.

Finally, in order to infer channels at a different wavelength, $\lambda'$, we need to fit in another missing piece. Recall that the phase of $a'_{1,n}$ inferred at wavelength, $\lambda_1$ for each of the paths, is dependent on the wavelength (since $a'_{1,n} = a_n \exp(-j2\pi d_n/\lambda_1 + j\phi_n)$). In order to infer the frequency-dependent component of $a'_{1,n}$, we leverage the fact that for cellular systems, the wireless signal is transmitted at multiple frequencies, called the OFDM subcarriers. The receiver determines uplink channels at each of these subcarrier frequencies in the process of decoding a received OFDM frame. Thus, we add the distance $d_n$ for each of the paths as a parameter of the optimization problem given in equation 10. This allows us to solve the optimization problem jointly for multiple subcarriers and adds constraints to the solutions returned by the optimization at different frequencies.

In particular, let us denote the channel measurements at wavelength, $\lambda_i$, by $\vec{h}_i$, i=0, 1, . . . , I–1. We define $$\vec{P}_i = F^{-1}\vec{h}_i,$$

and $S_i$ to be the matrix S corresponding to wavelength $\lambda_i$. Let, $D_i$ be the N×N diagonal matrix such that $$D_i(k,k) = \exp\left(-j\frac{2\pi d_k}{\lambda_i}\right)$$

and $\vec{a}$ be the N dimensional vector such that $i^{th}$ element is $a_i \exp(j\phi_i)$. Let denote the I K dimensional vector formed by the concatenation of the vectors $\vec{P}_i$ and S be the I K×N matrix formed by the concatenation of the matrices $S_iD_i$. Specifically:

$$\vec{P} = \begin{pmatrix} \vec{P}_1 \\ \vec{P}_2 \\ \vdots \\ \vec{P}_K \end{pmatrix} \quad S = \begin{pmatrix} S_1D_1 \\ S_2D_2 \\ \vdots \\ S_KD_K \end{pmatrix} \quad (12)$$

Thus, the modified objective function can be written as:

$$O(\{\psi_n,d_n,a_n\}_{n=0}^{N-1}) = \|\vec{P} - S\vec{a}\|^2 \quad (13)$$

This objective function is similar to equation 10. Like before, we can replace $\vec{a} = S^\dagger \vec{P}$. Thus, the objective function reduces to:

$$O(\{\psi_n,d_n\}_{n=0}^{N-1}) = \|\vec{P} - SS^\dagger \vec{P}\|^2 \quad (14)$$

The procedure for solving the optimization problem that transforms channels to paths is next described. Specifically, the goal of this procedure is to find the values of $\{\psi_n, d_n\}_{n=0}^{N-1}$, such that:

$$\{\psi_n, d_n\}_{n=0}^{N-1} = \arg\min_{\{\psi_n,d_n\}} O(\{\psi_n, d_n\}_{n=0}^{N-1}) \quad (15)$$

$$\text{s.t.} \quad -1 \leq \psi_n \leq 1 \ \forall n \in \{0, 1, \ldots, N-1\}$$

This optimization problem is non-convex and constrained. In order to solve this optimization problem, an interior-point method is used However, since the function is non-convex, the optimization is prone to convergence to a local minimum, which is not the global minimum. Thus, a good initialization is somewhat important to ensure that the correct solution is determined.

The system computes an approximate solution in order to initialize the minimization of the objective function described in Equation 14. We compute an approximate probability distribution, P such that $P(d,\psi)$ indicates the probability of the existence of a path from direction $\psi$ and distance d. A natural candidate to do so is the power of the inverse Fourier transform of the channel itself (akin to FIG. 4), which while prone to the windowing and superposition effects provides an approximate understanding of where signal paths emerge from. Generalizing the inverse Fourier transform to operate across both distance and angle-of-arrival, we define P to be:

$$P(d,\psi) = \left\|\sum_{\substack{i=1,\ldots,I \\ k=1,\ldots,K}} h_{i,k} \exp\left(j\frac{2\pi(d+kl\psi)}{\lambda_i}\right)\right\|^2$$

where $h_{i,k}$ denotes the channel measured at antenna k and wavelength $\lambda_i$ and l is the inter-antenna separation on the antenna array. Once, P has been computed for different values of d and $\theta$, we pick the N largest peaks to initialize the optimization problem with N paths.

So far, we have assumed that we know the number of paths, N, a priori. However, that is not the case in practice. Notice that, as we increase the number of paths, N, in our objective function, the minimum value attained on the objective function decreases. In other words, the algorithm keeps finding a better fit. However, after certain number of paths, we start to overfit, i.e., the additional paths being found do not correspond to physical paths, but to signal noise. This could lead to decrease in the accuracy of our channel estimation algorithm. In order to avoid overfitting and yet achieve a good fit, we incrementally add paths to the solution till one of the two conditions is met. Either, the value of the objective function drops below a threshold,≥ or decrease in the value of the objective function is small. When that happens, we select that value of N as the number of paths.

When the number of paths, N, is greater than 1, the optimization can find solutions, such that $(\psi_i, d_i)$ is very close to $(\psi_j, d_j)$ for $i \neq j$, i.e. two paths come from nearly the same angle and distance. In that case, the matrix S becomes ill-conditioned and can lead to poor solutions. In such cases, The system rejects one of these paths and reduces the number of paths by 1. This improves the condition number of the matrix and avoids overfitting.

Integrating with an LTE Architecture

This section describes an embodiment of the system's end-to-end system design, and how it interacts with the LTE protocol. The system takes as inputs wireless channels measured on the uplink at the base station for a particular user. It outputs the estimated wireless channels at the downlink frequency band for that user. These channels can then be used to perform beam-steering for advanced MIMO techniques (coherent beamforming, interference nulling, etc.).

The following steps summarize the system's approach presented above. (1) The system runs an iterative algorithm to find a representation of signal paths that fit the observed uplink channels. This is done by solving the optimization in Equation 14 as described above. (2) The system uses the recovered 4-tuple signal paths to map the uplink channels to the frequency used on the downlink channel (Eqn. 9). (3) Now that it has the values of the uplink channels for the downlink frequency, the system applies reciprocity to infer the downlink channels, by which it infers the forward channels from the reverse channels by multiplying by calibrated reciprocity constants, which are computed once for the lifetime of the device.

A number of issues arise when integrating the above steps with LTE cellular systems. One issues is that the base station measures the uplink channels in order to infer the downlink channels. However, since LTE uses SC-FDMA on the uplink, the client transmits its data only on a subset of all OFDM subcarriers. Thus, while LTE uses one thousand subcarriers, only a subset of those sub-carriers can be used to measure the uplink channels for a particular client at any point in time. However, in LTE, a client does not only send data. It also sends signaling information. In particular, the LTE standard uses Sounding Reference Signals (SRS) which the client sends periodically across OFDM subcarriers. The period of the SRS signal is configurable and takes values between 2 ms and 320 ms. Thus, the system measures the uplink channels using the SRS transmissions. It further refines these channels with measurements from uplink data and acknowledgments, which can provide new measurements every 1 ms, but span only a subset of the OFDM sub-carriers. Combining all these measurements allows the system to obtain a better estimate of the uplink channels, which naturally improves its inference of the downlink channels.

One however has to be careful when combining channel measurements that did not occur at exactly the same time. Measurements taken at different times can be affected by the carrier frequency offset (CFO) between the transmitter and receiver, frame detection delay as well as inherent delays in hardware. We discuss these effects and how we compensate for them before combining the channel measurements.

Between any client and the base station, there always exists an offset in frequency (CFO), $\delta f$. The CFO causes a phase rotation over time. Thus, two measurements of the same channel that are taken $\tau$ seconds apart, exhibit a phase difference of $2\pi\tau\delta f$. This phase difference is a measurement artifact; the channels over the air have not changed. To overcome this issue, we leverage the fact that for all MIMO techniques (beamforming, nulling, interference alignment, etc.) the parameter of importance is not the exact value of the wireless channels, but the relative change in the channels across the antennas. As a result, a constant multiplied to the channel measurements on all antennas does not affect our ability to perform all MIMO techniques. Thus, since all antennas on the base station experience the same CFO, one approach to eliminating the phase rotation caused by CFO is to divide the channel of each base station antenna by the channel of the first antenna, measured at the same point in time. This division scales all channels by the same value and hence does not affect MIMO techniques.

Another issue is that there is a time delay between the moment the signal reaches the radio and the moment when it actually gets detected. This delay causes an additional phase rotation in the measured channels. If we denote this detection delay by $t_d$, the additional phase rotation is given by $2\pi f t_d$. The channel measurements on all the antennas get effected by this quantity. This detection delay varies per measurement and thus, makes it infeasible to combine information across different measurements without eliminating the phase rotation due to the detection delay. To overcome this challenge, observe that across OFDM subcarriers any delay in time manifests itself as rotation in phase across subcarrier frequency whose slope is exactly $2\pi t_d$. As a result, The system can enforce consistency between measurements of the wireless channel at any given frequency by ensuring they have zero relative slope in phase.

Another issue is that the hardware across different antennas may introduce a fixed delay to the different receive chains. Thus, the wireless channel measured at each antenna suffers a phase rotation. In particular, the channel measured at an antenna with hardware delay t experiences an additional offset $\exp(-j2\pi c t/\lambda)$, where $\lambda$ is the wavelength of the signal and c is the speed of light. Further, this offset is different for different receive chains. Fortunately, hardware-induced phase offset is fixed for the lifetime of the base station and can be calibrated once, apriori and applied to all future channel measurements.

Figure 7:
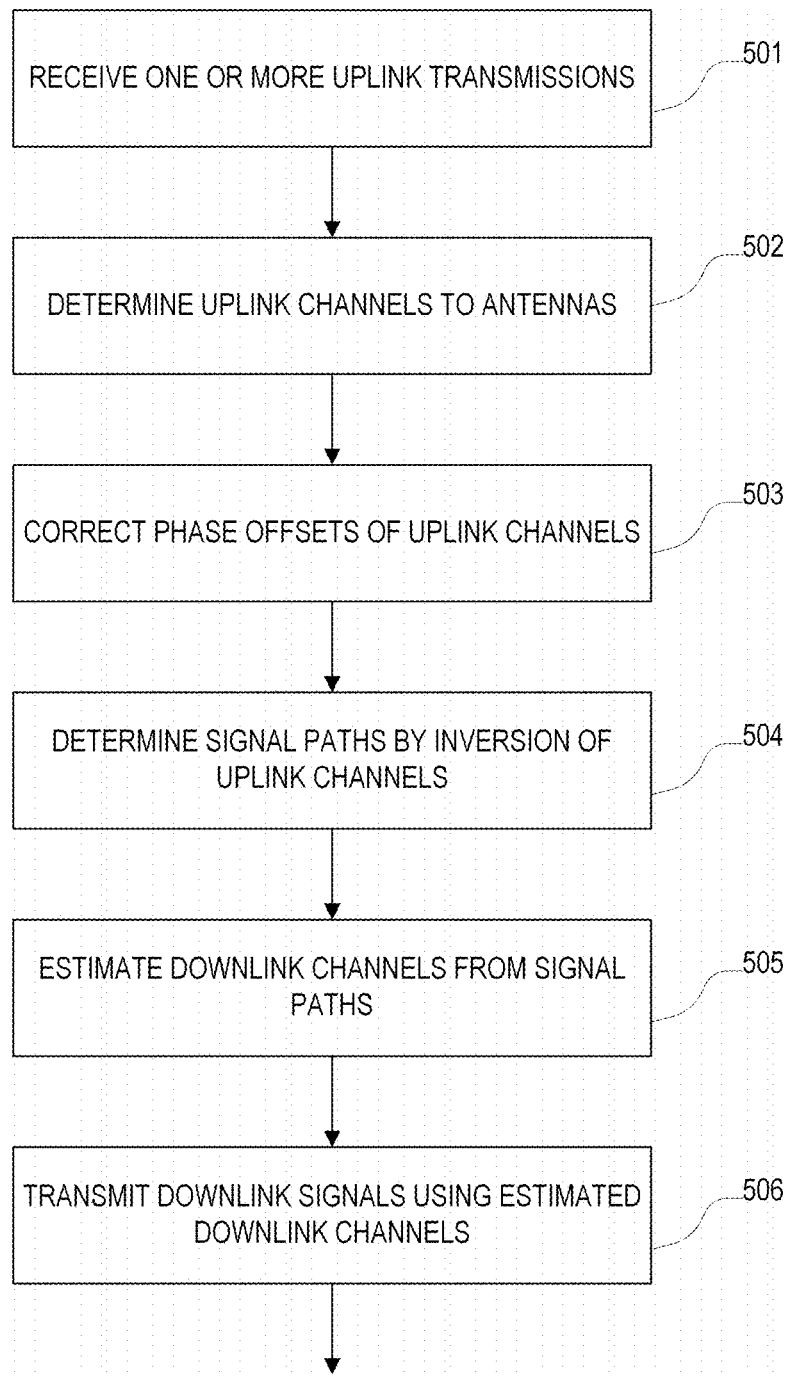
FIG. 7 is a flowchart of a processing procedure.

An example of the process can therefore be summarized by the flowchart of FIG. 7. At step 501, the base station receives one or more transmissions (i.e., LTE frames) from a remote device at each of the antennas of its antenna array. These transmissions includes components at a first set of multiple of frequencies. In the LTE example, these transmissions are OFDM encoded transmissions, and therefore the frequencies are the subcarrier frequencies of the components of the OFDM signal. At step 502, the receiver of the base station decodes the signals of received LTE, and in a conventional manner determines, for each antenna, the multiple channels for respective multiple subcarrier frequencies of the OFDM frame. At optional step 503, the channels are corrected for phase offsets resulting for example from carrier-frequency offset (CFO) or detection delay. At step 504, the set of N path lengths (e.g., expressed in meters), and corresponding directions (e.g., expressed in degrees), are determined by the inversion procedure described above from the uplink channels. At step 505, the downlink channels are estimated from the path lengths and directions. Finally, at step 506, a downlink signal is formed using the estimated downlink channels, for example, using conventional beamforming or MIMO techniques based on the downlink channels, to determine the antenna-specific signals which are used to transmit the downlink signal to the remote device.

The system's channel estimates can be used to improve overall throughput by reducing inter-cell interference at edge clients—devices that are close to cell boundaries and hence, receive signal from multiple base stations. The system adopts two strategies to limit the interference caused at edge clients by neighboring base stations: (1) It encourages sharing of information between adjacent base stations to predict uplink channels to users across base stations. This allows the base station to estimate the client channels and learn any potential interference from the channel estimates of its neighboring base stations. (2) Base stations can use the channel estimates they infer from the system to transmit to their clients while nulling interference to clients of other base stations that happen to be at cell edges. Indeed, the same wireless channels used for beamforming can be employed for interference nulling as well. Experimental results show that interference nulling at edge clients using the approach leads to improved throughput in LTE networks.

The approaches described above may be implemented in software, or in hardware, or a combination of hardware and software. The software may include instructions stored on a non-transitory machine-readable medium, and when executed on a general-purpose or a special-purpose processor implements some or all of the steps summarized above. The hardware may include Application-Specific Integrated Circuits (ASICs), Field Programmable Gate Arrays (FPGAs), and the like. The hardware may be represented in a design structure. For example, the design structure comprises a computer accessible non-transitory storage medium that includes a database representative of some or all of the components of a system embodying the steps summarized above. Generally, the database representative of the system may be a database or other data structure which can be read by a program and used, directly or indirectly, to fabricate the hardware comprising the system. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, alternatively, the database may itself be the netlist (with or without the synthesis library) or the data set.

It is to be understood that the foregoing description is intended to illustrate and not to limit the scope of the invention, which is defined by the scope of the appended claims. Other embodiments are within the scope of the following claims.

What is claimed is:

1. A method for radio frequency communication between a base station having an antenna array and a device having a transceiver, the method comprising:

receiving a first transmission from a transceiver at a plurality of antennas of the antenna array, the first transmission including components at a first plurality of frequencies;

computing receive characteristic data from the received first transmission, the receive characteristic data including for each frequency of the first plurality of frequencies, and each antenna of the plurality of antenna, a receive channel characteristic representing at least a phase of a channel;

computing propagation data characterizing a plurality of propagation paths from the transceiver to the antenna array, the propagation data including for each path data characterizing a propagation path length of a transmission path between the transceiver and the antenna, and a direction of the path;

computing transmit characteristic data from the propagation data, the transmit data including for each frequency of a second plurality of frequencies different than the first plurality of frequencies a transmit channel characteristic representing at least a phase of a channel; and transmitting a second transmission from the antennas of the antenna array directed to the transceiver, the second transmission including components at the second plurality of frequencies, including transmitting a plurality of antenna signals from corresponding antennas of the antenna array, each antenna signal being formed according to a transmit data characteristic for said antenna.

2. The method of claim 1 wherein the propagation data further includes for each antenna of the antenna array and each path data characterizing a frequency independent phase associated with the path.

3. The method of claim 1 wherein the first transmission comprises an Orthogonal Frequency Division Multiplexed (OFDM) transmission, and the first plurality of frequencies comprises subcarrier frequencies of the OFDM transmission.

4. The method of claim 1 wherein computing the receive characteristics data includes correcting a phase of a channel for at least one of a carrier frequency offset between the transceiver and a receiver coupled to the antenna array, and a delay in detection of the first transmission.

5. The method of claim 1, wherein the first plurality of frequencies span a first frequency range, and the second plurality of frequencies span a second frequency range disjoint from the first frequency range.

6. A method for characterizing transmit channels from an antenna array to a transceiver, the method comprising:

determining receive characteristic data for a plurality of uplink channels from the transceiver to the antenna array, each uplink channel being associated with a corresponding frequency of a first plurality of frequencies;

computing frequency-independent propagation data for a plurality of propagation paths between the transceiver and the antenna array, the frequency-independent propagation data including for each path data representing a propagation path length of a transmission path between the transceiver and the antenna array, and a direction of propagation of the path at the antenna array;

computing transmit characteristic data for a plurality of downlink channels from the antenna array to the transceiver from the frequency-independent propagation data, each downlink channel being associated with a corresponding frequency of a second plurality of frequencies different than the first plurality of frequencies; and providing the transmit characteristic data for forming a signal for transmission at frequencies of the second plurality of frequencies from the antenna array directed to the transceiver.

7. The method of claim 6 wherein each uplink channel is associated with a corresponding antenna of the plurality of antennas of the antenna array and a corresponding frequency of the first plurality of frequencies, and each downlink channel is associated with a corresponding antenna of the plurality of antennas of the antenna array and a corresponding frequency of the second plurality of frequencies.

8. The method of claim 6 wherein for at least some path the frequency-independent propagation data includes a frequency-independent phase associated with a reflection on the path.

9. The method of claim 6 wherein for each path the frequency-independent propagation data includes a frequency-independent attenuation of a signal propagated along the path.

10. The method of claim 6 further comprising:
processing one or more transmissions received at the antenna array from the transceiver, the one or more transmissions including components at frequencies of the first plurality of frequencies.

11. The method of claim 10 further comprising:
forming one of more transmit signals according to the transmit characteristic data; and
causing the one or more transmit signals to be emitted from the antenna array directed to the transceiver.

12. The method of claim 6 wherein computing the frequency-independent propagation data comprises estimating the number of the propagation paths and directions of said paths according to a match of a direction-dependent received signal characteristic of one or more transmission received at the antenna array from the transceiver.

13. A communication system configured to characterizes transmit channels from an antenna array to a transceiver, the system being configured to:
determine receive characteristic data for a plurality of uplink channels from the transceiver to the antenna array, each uplink channel being associated with a corresponding frequency of a first plurality of frequencies;
compute frequency-independent propagation data for a plurality of propagation paths between the transceiver and the antenna array, the frequency-independent propagation data including for each path data representing
a propagation path length of a transmission path between the transceiver and the antenna array, and a direction of propagation of the path at the antenna array;
compute transmit characteristic data for a plurality of downlink channels from the antenna array to the transceiver from the frequency-independent propagation data, each downlink channel being associated with a corresponding frequency of a second plurality of frequencies different than the first plurality of frequencies; and
provide the transmit characteristic data for forming a signal for transmission at frequencies of the second plurality of frequencies from the antenna array directed to the transceiver.

14. A non-transitory machine-readable medium comprising instructions stored thereon, the instructions when executed by a processor cause the processor to characterize transmit channels from an antenna array to a transceiver by:
determining receive characteristic data for a plurality of uplink channels from the transceiver to the antenna array, each uplink channel being associated with a corresponding frequency of a first plurality of frequencies;
computing frequency-independent propagation data for a plurality of propagation paths between the transceiver and the antenna array, the frequency-independent propagation data including for each path data representing a propagation path length of a transmission path between the transceiver and the antenna array, and a direction of propagation of the path at the antenna array;
computing transmit characteristic data for a plurality of downlink channels from the antenna array to the transceiver from the frequency-independent propagation data, each downlink channel being associated with a corresponding frequency of a second plurality of frequencies different than the first plurality of frequencies; and
providing the transmit characteristic data for forming a signal for transmission at frequencies of the second plurality of frequencies from the antenna array directed to the transceiver.

* * * * *